Feb. 12, 1929.

A. M. WOLF 1,701,964

MOTOR VEHICLE CONTROLLING MECHANISM

Filed Aug. 4, 1924  2 Sheets-Sheet 2

INVENTOR
Austin M. Wolf.

Patented Feb. 12, 1929.

1,701,964

UNITED STATES PATENT OFFICE.

AUSTIN M. WOLF, OF PLAINFIELD, NEW JERSEY.

MOTOR-VEHICLE CONTROLLING MECHANISM.

Application filed August 4, 1924. Serial No. 730,032.

My invention relates to the controlling means of motor vehicles and more particularly to an improved mounting and arrangement of the control lever or levers.

It is the primary object and purpose of my present improvements to provide a very simple and inexpensive mounting of the controls whereby the maximum amount of human energy can be exerted thereupon and in a manner which will not result in discomfort of the operator. A further object is to so co-relate the controls, that simultaneous operation of them will result in the maximum amount of energy being imparted to them, and that effort expended upon one, will not react unfavorably on the other, as in present mechanisms. This therefore insures maximum safety of operation. My invention is particularly applicable to the brake controls of motor vehicles, but naturally can be applied to the other controls.

With the above and other objects in view, the invention consists in the improved motor vehicle control and in the form, construction, mounting, and relative arrangement of the several parts thereof as will be hereinafter more fully described, illustrated in the accompanying drawings and subsequently incorporated in the subjoined claims.

Referring to the accompanying drawings in which I have illustrated one satisfactory embodiment of the invention and in which similar reference characters designate corresponding parts throughout the several views.

Figure 1:
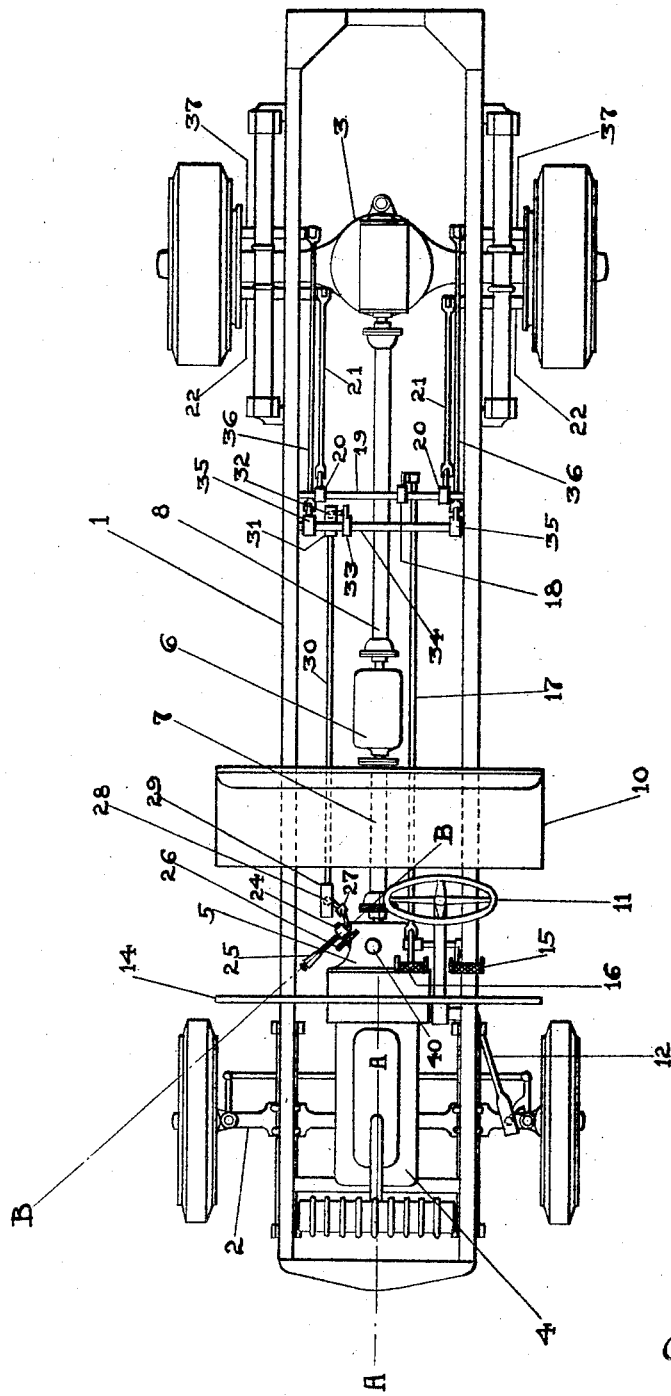
Figure 1 is a plan view of a motor vehicle chassis incorporating my brake control.

Referring to Figure 1, the chassis frame 1 is spring-mounted in the customary manner on axles 2 and 3. The engine 4 is suspended in the chassis frame 1, with the clutch unit 5 secured to the bell housing. Power is conveyed to and from the transmission 6 by means of the propeller shafts 7 and 8. The driver's seat 10 is suitably located behind the steering wheel 11, the latter actuating the drag-link 12 which controls the steering spindles of axle 2. In the drawings I have shown a vehicle with left hand drive and center control. Any variation in the above would naturally alter the position of the other relating parts, but they would bear a corresponding relationship to the driver.

Figure 2:
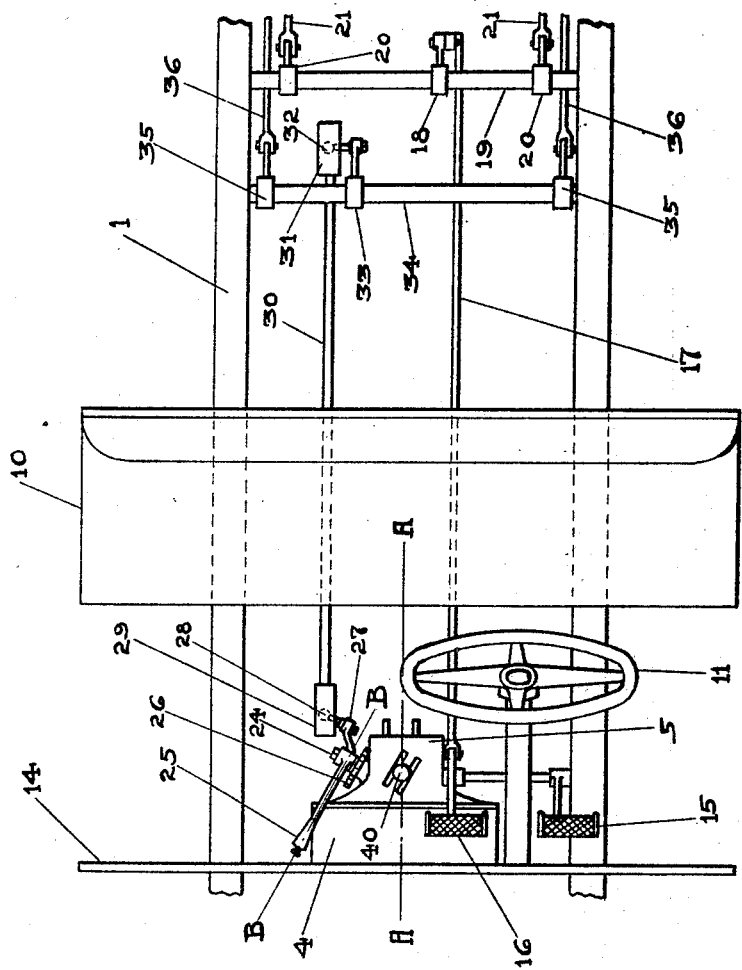
Figure 2 is an enlarged view of same in the vicinity of the driver's seat.
Figure 3:
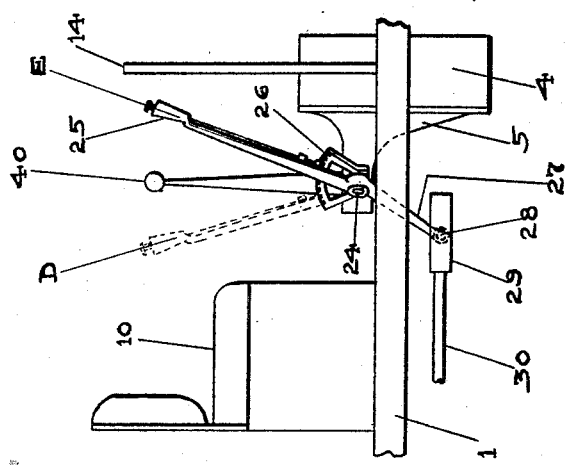
Figure 3 is an elevation of this portion of the chassis.

Referring to Figures 1, 2 and 3, the dash 14 is located in its usual position. The clutch pedal 15 is located to the left of the brake pedal 16. The latter is connected with the foot-brake pull-rod 17, which is connected to lever 18 on the cross shaft 19. Levers 20 on shaft 19 convey the pull exerted by rod 17, when pedal 16 is depressed by the foot, to the rods 21 which are connected to levers on the axle brake-shafts 22. I place lever 18 near the center of shaft 19 in order to equalize the distortion that would otherwise take place with a one-sided hook-up.

The emergency brake lever 25 is mounted on the clutch unit 5, or any other suitable anchoring point. The lever 25, instead of being mounted with its fulcrum 24 perpendicular to the longitudinal axis A—A of the vehicles, swings in the plane B—B which is at an angle to axis A—A, instead of being parallel to it as is customary practice. The quadrant 26 is naturally placed parallel to plane B—B, and serves to hold lever 25 in the on-position. Brake lever 25 extends downward beyond fulcrum 24 and forms lever 27 to which is secured the ball-end 28. The socket 29 encompassing same forms one end of the emergency-brake pull-rod 30; a similar socket 31 encompasses the ball-end 32 attached to lever 33 on cross shaft 34. Lever 33 is placed near the center of shaft 34 for the purpose of equalization, as before explained for lever 18 on shaft 19. The levers 35 convey the pull derived from hand lever 25 and pull-rod 30 to the rods 36 which are coupled at their rear ends with levers on the axle-shafts 37.

The pull rod 30 can be provided with the usual yoke-ends at each end if desired, as the movement of the ball-end 28 is not excessive in a transverse direction. However I prefer to use ball joints as there will then be absolutely no springing in the brake connections, and this is desirable to avoid in order that all energy go into the braking, rather than distortion of parts which is wasteful of energy; with ball joints the distance between the ball-ends 28 and 32 cannot vary at all.

In the ordinary emergency brake-lever location, to one side of the longitudinal axis of the vehicle, in order that ample clearance be allowed for the gear shift lever, and in a plane parallel to the said axis, one's pull becomes less the farther the lever is drawn back, due to the lever's being to one side. The muscles of the arm become less powerful as the arm becomes extended and cranked (in plan view) and a point is reached when the arm leverage is at a great disadvantage and the muscular exertion on the lever decreases. If one attempts to use foot and hand brakes at the same time, the simultaneous depressing of the brake pedal and pulling on the hand lever brings about a trying and disadvantageous condition for one's arm and leg, power being lost in both, due to the offset of the points of application of the arm and foot, because of the brake lever being off to one side. Furthermore muscular energy is lost in resisting the tendency of one's body being drawn to a position midway between the points of energy application to the pedal and lever.

With my invention, the utmost can be gotten out of the arm muscles, as the pull is toward the shoulder, and the effort is not exerted a considerable distance to one side, parallel to the longitudinal axis of the car. Furthermore, one is able to throw the inertia of one's body (from the hips up) and the muscular energy thereof on the lever, besides the arm muscular energy. This is impossible in the ordinary construction. When using both brakes simultaneously, the brake pedal becomes a brace, and the maximum thrust in opposite directions comes on the pedal and lever. The muscular action and reaction of the body as a whole works both ways, on each control such as to give the maximum results.

The conditions above enumerated are especially noticeable on commercial vehicles, where considerable energy is required to stop them. In such vehicles the offset conditions of the driver himself in relation to the emergency brake lever is considerable. My invention aims particularly for safe operation of such vehicles, so that they can be quickly brought to a stop when an emergency arises.

The offset, parallel-to-centerline condition of the ordinary brake lever is faulty in that in the on-position one generally strikes the knee of the passenger sitting alongside the driver. In my construction, this is obviated, because when the lever 25 is in the position D (see Figure 3) the lever end is away from the passenger and toward the driver. There is no interference between them. When the lever is released and pushed forward to position E it is out of the way of the passenger, as his feet, which in plan view would be projected under the lever handle, are considerably below it and out of its way altogether.

Inasmuch as the greatest energy is required for braking, I have only shown my invention applied to the braking system. However, if desired, the gear shift lever 40 can be made to shift at an angle for similar reasons. Also, if desired, the pedals 15 and 16 can be so mounted. If so placed, the hand levers may or may not be placed at an angle, the object being that a proper corelation be maintained between them, in order to obtain the maximum efficiency of muscular energy.

I have only shown one means of connecting a lever mounted at an angle, but it will readily be seen that many other means can be provided, such as gears, cams, compounding or auxiliary levers, cable and drum, screw and nut, etc., or any combination of same.

While I have herein described and shown but one embodiment of my invention, it is nevertheless to be understood that the objects in view might be attained by means of various other alternative constructions and I, therefore, reserve the privilege of resorting to all such legitimate changes as may be fairly embodied within the spirit and scope of the invention as claimed.

I claim:

1. A motor vehicle control mechanism comprising a chassis, a power plant mounted thereon, power transmitting mechanism, braking mechanisms, a plurality of controlling devices for said mechanisms operating in substantially parallel vertical planes, and a controlling device operating in a substantially vertical plane at an angle to the planes of said devices.

2. A motor vehicle control mechanism comprising a chassis, a power plant mounted thereon, power transmitting mechanism, braking mechanism, controlling devices for said mechanisms comprising a pedal mounted on said chassis, and a lever mounted thereon so that its substantially vertical plane of operation is at an angle to the plane of operation of said pedal.

3. A motor vehicle control mechanism comprising a chassis, braking mechanism, a driver's seat mounted on said chassis, and a controlling device for said mechanism mounted on said chassis to operate in a substantially vertical plane at an angle to the longitudinal axis of said chassis and toward the driver's position.

4. A motor vehicle control mechanism comprising a chassis, braking mechanism, a driver's seat mounted on said chassis, and an emergency brake lever controlling said braking mechanism on the other side of the longitudinal axis of the chassis from the driver's position and mounted to operate in a plane at an angle to the said axis.

5. A motor vehicle control mechanism comprising a braking unit, a brake lever therefor, and mounting means for same consisting of a substantially horizontal fulcrum pin at an acute angle to the transverse axis of the vehicle.

6. A motor vehicle control mechanism comprising a power producing unit, having a bell-housing, a control lever operating in a plane at an angle to the axis of said power producing unit, and means for supporting said lever from said bell-housing.

In testimony that I claim the foregoing as my invention, I have signed my name hereunder.

AUSTIN M. WOLF.